United States Patent
Im

(10) Patent No.: US 8,909,895 B2
(45) Date of Patent: Dec. 9, 2014

(54) MEMORY APPARATUS

(75) Inventor: Jung-Been Im, Anyang-si (KR)

(73) Assignee: Samsung Electronics Co., Ltd., Suwon-Si, Gyeonggi-Do (KR)

(*) Notice: Subject to any disclaimer, the term of this patent is extended or adjusted under 35 U.S.C. 154(b) by 198 days.

(21) Appl. No.: 13/471,888

(22) Filed: May 15, 2012

(65) Prior Publication Data

US 2012/0311238 A1    Dec. 6, 2012

(30) Foreign Application Priority Data

Jun. 3, 2011   (KR) .................. 10-2011-0054143

(51) Int. Cl.
*G06F 9/26*    (2006.01)
*G06F 3/06*    (2006.01)
*G06F 12/06*   (2006.01)

(52) U.S. Cl.
CPC .............. *G06F 3/0616* (2013.01); *G06F 3/064* (2013.01); *G06F 2212/7208* (2013.01); *G06F 3/0688* (2013.01); *G06F 12/0638* (2013.01)
USPC .......................................... 711/201; 711/103

(58) Field of Classification Search
None
See application file for complete search history.

(56) References Cited

U.S. PATENT DOCUMENTS

2008/0022154 A1* 1/2008 Endou ............................ 714/30
2010/0023675 A1* 1/2010 Chen et al. ................... 711/103
2010/0057979 A1* 3/2010 Chu et al. ..................... 711/103

FOREIGN PATENT DOCUMENTS

| JP | 2007-241896 | 9/2007 |
| JP | 2007-334852 | 12/2007 |
| KR | 1020080067334 | 7/2008 |
| KR | 1020080078129 | 8/2008 |

* cited by examiner

*Primary Examiner* — Charles Rones
*Assistant Examiner* — Han Doan
(74) *Attorney, Agent, or Firm* — F. Chau & Associates, LLC

(57) ABSTRACT

A memory apparatus is provided. The memory apparatus includes a first memory chip, a second memory chip and a control unit configured to manage a first mapping table for the first memory chip and a second mapping table for the second memory chip. If a first physical address of the second memory chip is allocated to a first logical address of the first memory chip, the control unit is configured to update a second logical address of the second memory chip to correspond to the first physical address of the second memory chip in the second mapping table and update the first logical address of the first memory chip to correspond to the second logical address of the second memory chip in the first mapping table.

20 Claims, 12 Drawing Sheets

MEMORY APPARATUS

CROSS-REFERENCE TO RELATED APPLICATION

This application claims priority to Korean Patent Application No. 10-2011-0054143, filed on Jun. 3, 2011, in the Korean Intellectual Property Office, the disclosure of which is incorporated by reference in its entirety herein.

TECHNICAL FIELD

The inventive concept relates to a memory apparatus.

DISCUSSION OF RELATED ART

A memory apparatus including a memory writes data to the memory in response to a write request or reads data stored in the memory in response to a read request from an executing computer program. The request includes a logical address. The logical address is the address at which an item appears to reside in memory from the perspective of the computer program. The actual address may be accessed by converting the logical address to a physical address based on a mapping table.

However, the conversion process may be timing consuming. Thus, when the memory includes several memory chips, a memory apparatus that can efficiently manage a mapping table is required.

SUMMARY

According to an exemplary embodiment of the inventive concept, a memory apparatus includes a first memory chip and a second memory chip; and a control unit configured to manage a first mapping table for the first memory chip and a second mapping table for the second memory chip, wherein if a first physical address of the second memory chip is allocated to a first logical address of the first memory chip, the control unit is configured to update a second logical address of the second memory chip to correspond to the first physical address of the second memory chip in the second mapping table and update the first logical address of the first memory chip to correspond to the second logical address of the second memory chip in the first mapping table.

The first mapping table may be stored in the first memory chip and the second mapping table may be stored in the second memory chip. In this example, the control unit may include a RAM configured to store the first mapping table and the second mapping table; a processor configured to update the first mapping table and the second mapping table both stored within the RAM; and a memory controller unit connected to the first memory chip and the second memory chip.

If the first physical address of the second memory chip is allocated to the first logical address of the first memory chip and then a read request for the first logical address of the first memory chip is generated, the processor may be configured to change the first logical address of the first memory chip to the first physical address of the second memory chip based on the first mapping table and the second mapping table both being stored to the RAM and control the memory controller unit to access the first physical address of the second memory chip to perform the read request.

If the first physical address of the second memory chip is allocated to the first logical address of the first memory chip and then a write request for the first logical address of the first memory chip is generated, the processor may be configured to allocate a second physical address of the second memory chip to the first logical address of the first memory chip and update the second logical address of the second memory chip to correspond to the second physical address of the second memory chip in the second mapping table. In this example, the processor may be configured to control the memory controller unit to access the second physical address of the second memory chip and to perform the write request on the second physical address. In this example, the memory controller unit may include a first memory controller connected to the first memory chip; and a second memory controller connected to the second memory chip.

The control unit may be configured to determine a mapping between the first memory chip and the second memory chip and then allocate the first physical address of the second memory chip to the first logical address of the first memory chip.

If a number of first bad blocks of the first memory chip is greater than a first reference value and if a value obtained by subtracting the number of second bad blocks of the second memory chip from the number of first bad blocks is greater than a second reference value, the control unit may be configured to allocate the first physical address of the second memory chip to the first logical address of the first memory chip.

If a first wear count of the first memory chip is greater than a third reference value and if a value obtained by subtracting second wear count of the second memory chip from the first wear count of the first memory chip is greater than a fourth reference value, the control unit may be configured to allocate the first physical address of the second memory chip to the first logical address of the first memory chip.

According to an exemplary embodiment of the inventive concept, an electronic apparatus includes a memory having a first memory chip and a second memory chip; and a control unit configured to control the memory. If a first physical address of the second memory chip is allocated to a first logical address of the first memory chip, the control unit is configured to allocate a second logical address of the second memory chip as a parameter for indirectly mapping the first logical address of the first memory chip to the first physical address and indirectly mapping the first physical address of the second memory chip to the first logical address of the first memory chip based on the second logical address in the first mapping table and the second mapping table.

The second logical address of the second memory chip may correspond to the first physical address of the second memory chip in the second mapping table and the first logical address of the first memory chip may correspond to the second logical address of the second memory chip in the first mapping table.

The memory may be a flash memory. The memory may be included in a solid state drive. The memory may be included in a server.

A memory apparatus according to an exemplary embodiment of the inventive concept includes a first memory chip having a first mapping table, a second memory chip having a second mapping table, and a controller unit. The first mapping table includes a first entry having a first logical address of the first memory chip mapping to a first physical address of the first memory chip. The controller unit is configured to process a write request including the first logical address and data by performing a first operation that adds a second entry to the second mapping table including a second logical address of the second memory chip and a second physical address of the second memory chip, changes the first entry to map the first logical address to the second logical address, and writes the data to the second physical address.

The controller unit may be configured to process a subsequent read request including the first logical address by accessing the first entry using the first logical address as an index to determine the second logical address, accessing the second entry using the second logical address as an index to determine the second physical address, and reading the data from the second physical address.

The controller unit may be configured to process a subsequent write request including the first logical address and second data by accessing the first entry using the first logical address as an index to determine the second logical address, accessing the second entry using the second logical address as an index, changing the second entry to map to a third physical address of the second memory chip, and writing the second data to the third physical address.

The controller unit may be configured to free memory associated with the second physical address as the second data is written or after the second data is written.

The controller unit may be configured to perform the first operation only when a number of bad blocks or a wear count value of the first memory chip is above a reference value, and otherwise performs a second operation that allocates a fourth physical address of the first memory chip, changes the first entry to map the first logical address to the fourth physical address, and writes the data to the fourth physical address.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION

Figure 1:
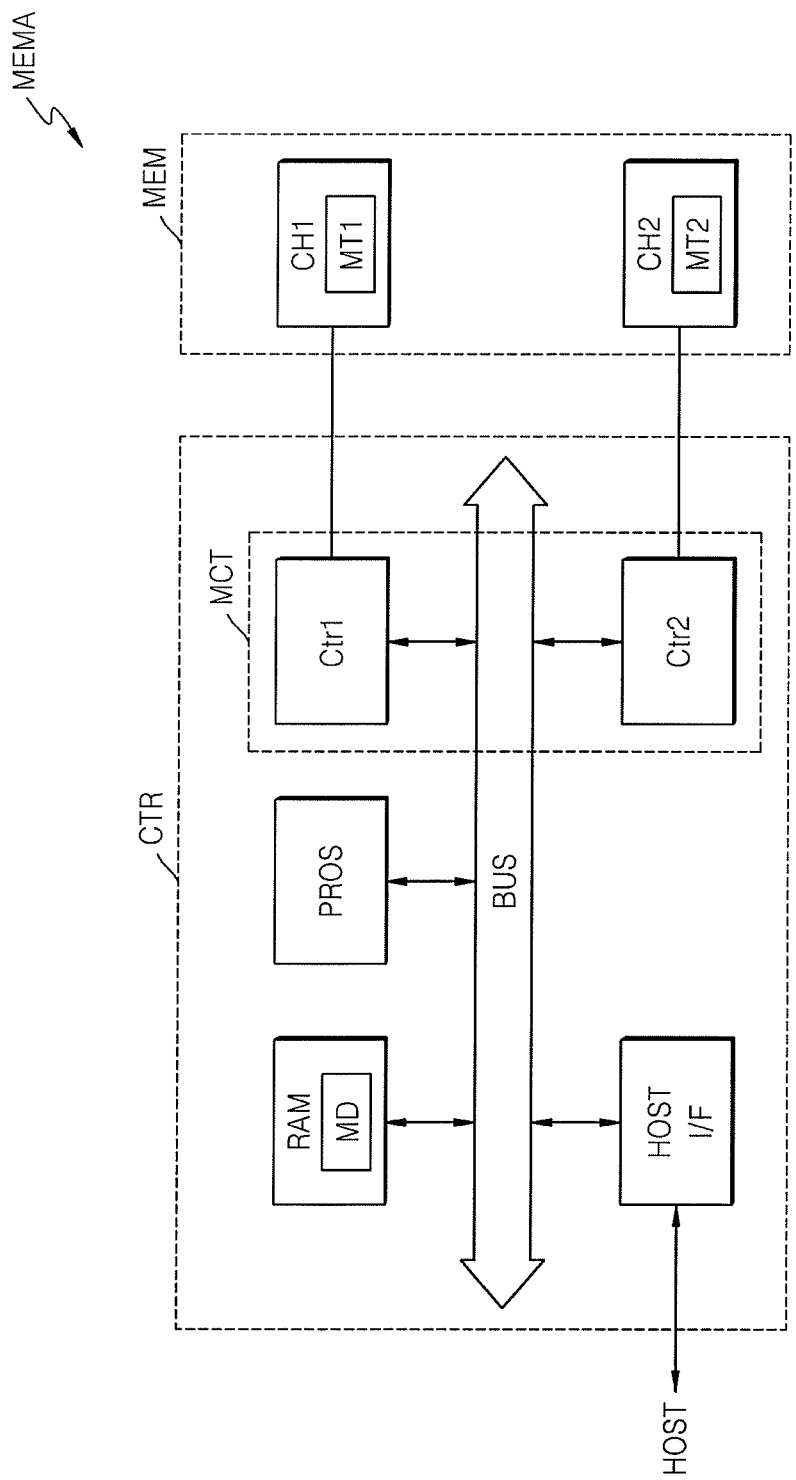
FIG. 1 is a block diagram of a memory apparatus according to an exemplary embodiment of the inventive concept.

Hereinafter, exemplary embodiments of the inventive concept will be described in detail with reference to the accompanying drawings. In the drawings, like reference numerals denote like elements.

FIG. 1 is a block diagram of a memory apparatus MEMA according to an exemplary embodiment of the inventive concept.

Referring to FIG. 1, the memory apparatus MEMA includes a memory MEM and a control unit CTR. In an embodiment, the memory apparatus MEMA is a solid state drive (SSD). An SSD is a data storage device that uses solid-state memory to store persistent data with the intention of providing access in the same manner as an input/output I/O hard disk drive (HDD). An SSD uses microchips that retain data on non-volatile memory chips, without requiring moving parts such as spinning disks or movable read/write heads. However, the memory apparatus MEMA is not limited to the solid state drive (SSD). For example, in an alternate embodiment, the memory apparatus is a HDD.

The memory MEM includes a plurality of memory chips, namely, first and second memory chips CH1 and CH2. In an embodiment, the first and second memory chips CH1 and CH2 are each flash memories. However, the inventive concept is not limited to the memory chips being flash memories. For example, in an alternate embodiment, the memory chips can be various other types of memories such as a ferroelectric RAM, etc. In an embodiment, each of the first and second memory chips CH1 and CH2 have a block and a page structure. In an embodiment, each of the first and second memory chips CH1 and CH2 include a plurality of blocks, each of which includes a plurality of pages.

The sizes of blocks and pages may be set differently in each flash memory. For example, a flash memory with a total size of 16 MB, a block size of 16 KB, and a page size of 512 B, includes 1024 blocks, wherein each block includes 32 pages. However, the size of the memory and its block and page sizes are not limited thereto, as memory size, block size, and page size may be set to various values.

In an embodiment, writing and reading of data are performed in units of pages, and electrical erasing of data is performed in units of blocks. For example, an individual page can be read from or written to, and an entire block including several pages can be erased. In an embodiment, a block is electrically erased before writing data into a page of the block.

In FIG. 1, the memory apparatus MEMA includes the two memory chips, namely, the first and second memory chips CH1 and CH2. However, the inventive concept is not limited thereto as the number of memory chips included in the memory apparatus MEMA may be increased as needed.

In an embodiment, the control unit CTR includes a host interface HOST I/F, a processor PROS, a RAM, and a memory controller unit MCT that are electrically connected to each other by a bus BUS.

In an embodiment, the memory controller unit MCT includes a plurality of memory controllers, namely, first and second memory controllers Ctr1 and Ctr2. The first memory controller Ctr1 is electrically connected to the first memory chip CH1 and the second memory controller Ctr2 is electrically connected to the second memory chip CH2. However, the inventive concept is not limited thereto. For example, the number of memory controllers included in the memory controller unit MCT may include only a single memory controller or it may include additional memory controllers. Further, more than one memory chip may be connected to one memory controller. For example, when the second memory controller Ctr2 is omitted, the first memory controller Ctr1 is connected to both the first memory chip CH1 and the second memory chip CH2.

In response to a request of a host (not illustrated), the processor PROS controls the memory controller unit MCT to perform an operation corresponding to the request to the memory MEM. The request of the host may be a write request or a read request. The write request may include a write command, a logical address, and data, and the read request may include a read command and a logical address.

The memory controller unit MCT accesses the memory MEM and performs the operation corresponding to the request through the control of the processor PROS. The memory controller unit MCT accesses the memory MEM using a physical address that is derived from the logical address. In an embodiment, the processor PROS performs an address change operation to convert the logical address to a physical address. In an embodiment, the address change operation is performed based on mapping tables, for example, first and second mapping tables MT1 and MT2. In an embodiment, the first and second memory chips CH1 and CH2 store the first and second mapping tables MT1 and MT2, respectively.

Figure 2:
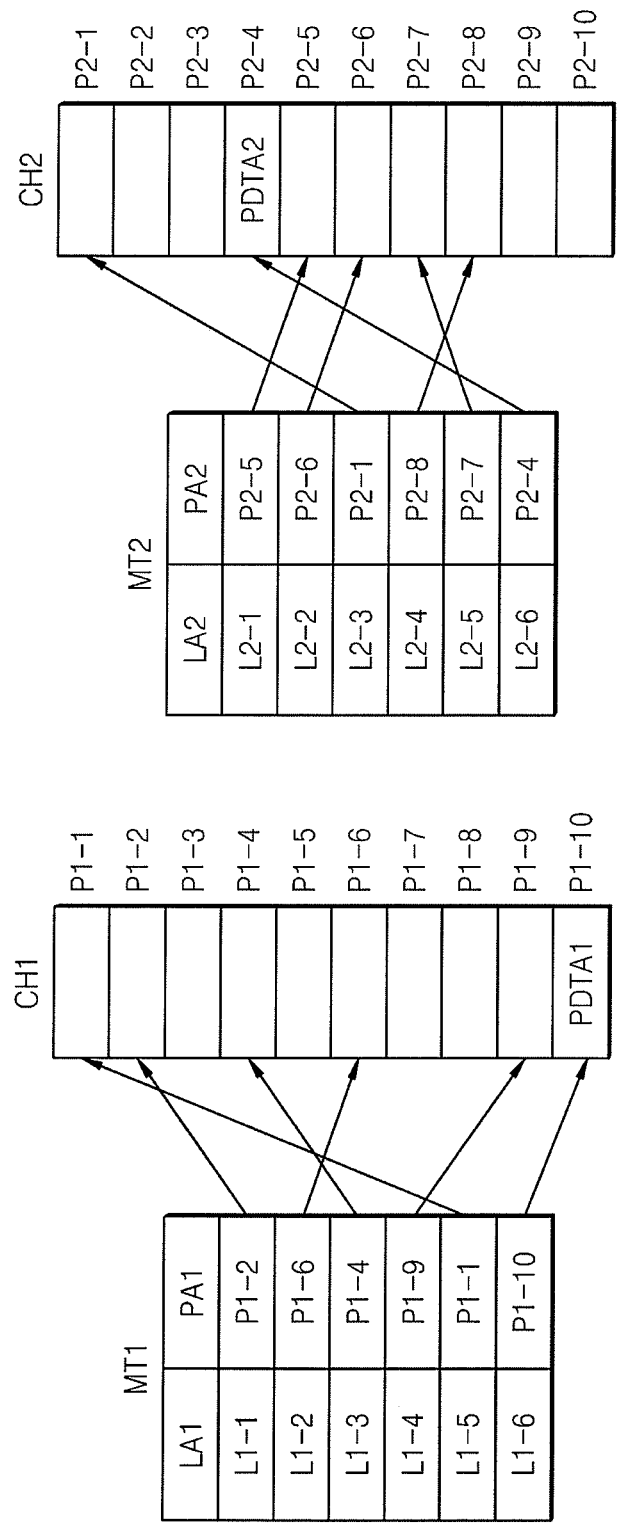
FIG. 2 illustrates an example of a plurality of memory chips that may be included in the memory apparatus of FIG. 1 and a plurality of mapping tables for the plurality of memory chips.

FIG. 2 illustrates an example of the first and second memory chips CH1 and CH2 included in the memory apparatus MEMA of FIG. 1 and the first and second mapping tables MT1 and MT2 for the first and second memory chips CH1 and CH2, respectively.

Referring to FIGS. 1 and 2, the first and second mapping tables MT1 and MT2 one-to-one correspond to the first and second memory chips CH1 and CH2. Each of the first and second mapping tables MT1 and MT2 include logical-physical address correspondence relationships for the corresponding memory chip from among the first and second memory chips CH1 and CH2. A logical-physical address correspondence relationship for the corresponding memory chip defines a physical address of the memory chip corresponding to a logical address of the memory chip.

The logical-physical address correspondence relationships included in the first mapping table MT1 define one-to-one correspondence relationships of logical addresses LA1 L1-1 through L1-6 of the first memory chip CH1 and physical addresses PA1 of the first memory chip CH1. The logical-physical address correspondence relationships included in the second mapping table MT2 define one-to-one correspondence relationships of logical addresses LA2 L2-1 through L2-6 of the second memory chip CH2 and physical addresses PA2 of the second memory chip CH2.

For example, in the first mapping table MT1 of FIG. 2, the sixth logical address L1-6 of the first memory chip CH1 corresponds to the tenth physical address P1-10 of the first memory chip CH1. In the second mapping table MT2 of FIG. 2, the sixth logical address L2-6 of the second memory chip CH2 corresponds to the fourth physical address P2-4 of the second memory chip CH2. However, FIG. 2 is merely an example as logical-physical address correspondence relationships included in the first and second mapping tables MT1 and MT2 are not limited thereto.

According to a mapping method, one physical address in the first and second mapping tables MT1 and MT2 may indicate one page or one block. The mapping method may be a page mapping method, a block mapping method, and a hybrid mapping method according to a mapping unit.

In the page mapping method, a mapping operation is performed in a page unit, and in the block mapping method, a mapping operation is performed in a block unit. In the hybrid mapping method, a plurality of blocks included in the first and second memory chips CH1 and CH2 are divided into a data block and a log block. The block mapping method is applied to the data block and the page mapping method is applied to the log block.

Hereinafter, for convenience of description, it is assumed that one physical address in the first and second mapping tables MT1 and MT2 indicates one page.

Referring back to FIGS. 1 and 2, in an embodiment, metadata MD used in an operation of the processor PROS is loaded into the RAM of the control unit CTR. The metadata MD is information that may be used to manage the memory MEM. For example, the metadata MD may include logical-physical address correspondence relationships used in the address change operation. The metadata MD may include the first and second mapping tables MT1 and MT2. Accordingly, the first and second mapping tables MT1 and MT2 may be loaded (stored) into the RAM.

In an embodiment, the processor PROS of the control unit CTR manages the first mapping table MT1 for the first memory chip CH1 and the second mapping table MT2 for the second memory chip CH2. The processor PROS may change a logical address, which is included in a request, to a physical address based on the first and second mapping tables MT1 and MT2 loaded into the RAM. Also, the processor PROS may allocate a new physical address to the logical address and update the first and second mapping tables MT1 and MT2 so that the logical address may correspond to the new physical address.

When the request is a write request, the memory controller unit MCT accesses a memory chip corresponding to the physical address from among the first and second memory chips CH1 and CH2 and writes data to the memory chip through the control of the processor PROS.

For example, the write request may include the sixth logical address L1-6 of the first memory chip CH1 and first primary data PDTA1. The processor PROS changes the sixth logical address L1-6 of the first memory chip CH1 to the tenth physical address P1-10 of the first memory chip CH1 based on the first mapping table MT1. Here, it is assumed that the tenth physical address P1-10 of the first memory chip CH1 was previously electrically erased. Through the control of the processor PROS, the first memory controller Ctr1 accesses the tenth physical address P1-10 of the first memory chip CH1 and writes the first primary data PDATA1 thereto.

When the request is a read request, the memory controller unit MCT accesses a memory chip corresponding to the physical address from among the first and second memory chips CH1 and CH2 and reads data from the memory chip through the control of the processor PROS.

For example, the read request may include the sixth logical address L2-6 of the second memory chip CH2. The processor PROS changes the sixth logical address L2-6 of the second memory chip CH2 to the fourth physical address P2-4 of the second memory chip CH2 based on the second mapping table MT2. Here, it is assumed that second primary data PDTA2 was previously stored in the fourth physical address P2-4 of the second memory chip CH2. Through the control of the processor PROS, the second memory controller Ctr2 accesses the fourth physical address P2-4 of the second memory chip CH2 and reads the second primary data PDTA2.

Data to be written to the memory MEM or data to be read from the memory MEM may be temporarily stored in a cache buffer (not illustrated). The cache buffer may be an SRAM (not illustrated).

The host interface HOST I/F may transmit a request of a host (not illustrated) to the processor PROS or transmit data read from the memory MEM to the host. The host interface HOST I/F may interface with the host through various interface protocols such as universal serial bus (USB), man machine communication (MMC), peripheral component interconnect-express (PCI-E), serial advanced technology attachment (SATA), parallel advanced technology attachment (PATA), small computer system interface (SCSI), enhanced small device interface (ESDI), or intelligent drive electronics (IDE).

In FIG. 2, each of the first and second mapping tables MT1 and MT2 includes logical-physical address correspondence relationships for the corresponding memory chip from among the first and second memory chips CH1 and CH2. It is efficient to store metadata such as the first and second mapping tables MT1 and MT2 of the first and second memory chips CH1 and CH2 in each of the first and second memory chips CH1 and CH2.

When the metadata of the first memory chip CH1 is stored in the second memory chip CH2, the memory controller unit MCT accesses the first memory chip CH1 by accessing the second memory chip CH2. However, in this example, access of the first memory chip may be delayed and thus a data process speed may be reduced. Also, when the metadata of the first memory chip CH1 is stored in the second memory chip CH2, and as illustrated in FIG. 1, when different memory controllers, namely, the first and second memory controllers Ctr1 and Ctr2, are connected to the first memory chip CH1 and the second memory chip CH2, respectively, the two memory controllers, namely, the first and second memory controllers Ctr1 and Ctr2, may be operated to access the first memory chip CH1. In this example, an overhead for data processing of the memory apparatus MEMA may increase.

Accordingly, it is efficient to store metadata of each of the first and second memory chips CH1 and CH2 in each of the first and second memory chips CH1 and CH2, and the first and second mapping tables MT1 and MT2 of the first and second memory chips CH1 and CH2 include logical-physical address correspondence relationships for the corresponding memory chip.

However, capacities of each of the first and second memory chips CH1 and CH2 are limited. Accordingly, in at least one embodiment of the inventive concept, the first and second memory chips CH1 and CH2 may be mapped with each other. In the mapping between the first and second memory chips CH1 and CH2, a logical address of the first memory chip CH1 is allocated to a physical address of the second memory chip CH2. In the mapping between the second and the first memory chips CH2 and CH1, a logical address of the second memory chip CH2 is allocated to a physical address of the first memory chip CH1.

An operation performed in the memory apparatus MEMA when the first and second memory chips CH1 and CH2 are mapped with each other is as described with reference to FIGS. 3 through 6 according to an exemplary embodiment of the inventive concept.

Figure 3:
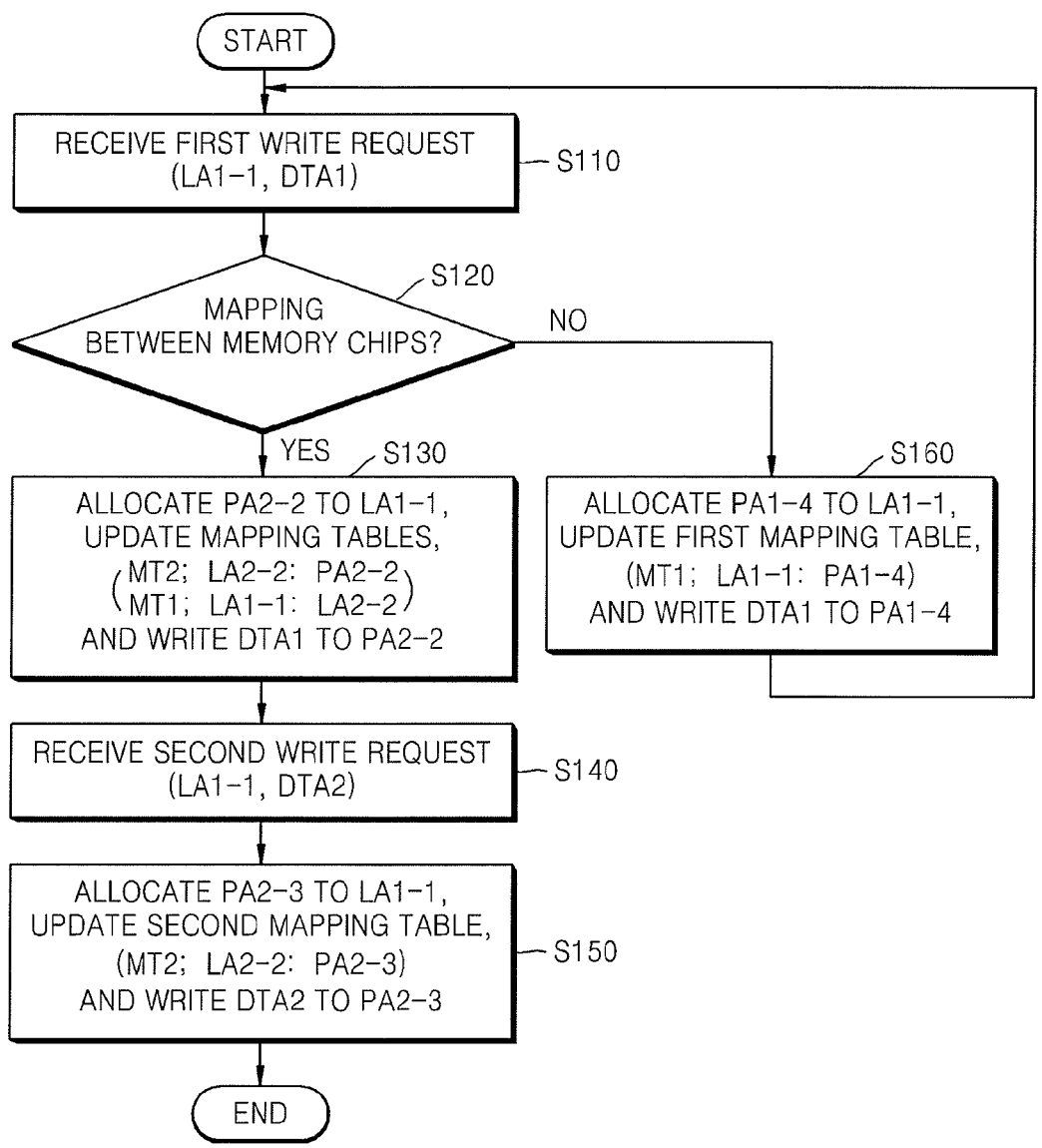
FIG. 3 is a flowchart illustrating an operation method performed in the memory apparatus of FIG. 1, according to an exemplary embodiment of the inventive concept.

FIG. 3 is a flowchart illustrating an operation method performed in the memory apparatus MEMA of FIG. 1, according to an exemplary embodiment of the inventive concept.

Referring to FIGS. 1 and 3, the processor PROS of the memory apparatus MEMA receives a first write request, in operation S110. The first write request includes a first request logical address LA1-1 of the first memory chip CH1 and first data DTA1.

In operation S110, it is assumed that the first request logical address LA1-1 of the first memory chip CH1 in the first mapping table MT1 corresponds to a first request physical address of the first memory chip CH1, wherein the first request physical address previously stores primary data. Accordingly, the primary data may be updated to the first data DTA1 in the first request logical address LA 1-1 of the first memory chip CH1 due to the first write request in operation S110.

According to a characteristic of a flash memory, when the primary data stored in the first request physical address of the first memory chip CH1 is not electrically erased, the first data DTA1 may not be re-written to the first request physical address of the first memory chip CH1. Since the data is electrically erased in units of blocks, the memory apparatus MEMA does not electrically erase the primary data in the first memory chip CH1, allocates a new physical address to the first request logical address LA1-1 of the first memory chip CH1 instead of the first request physical address, and writes the first data DTA1 to the new physical address.

The allocation of the new physical address to the first request logical address LA1-1 of the first memory chip CH1 includes the processor PROS determining whether to map between the first and second memory chips CH1 and CH2, in operation S120. A method of determining whether to map between the first and second memory chips CH1 and CH2 is described later.

When it is determined that a mapping between the first and second memory chips CH1 and CH2 will occur, operation S130 of the memory apparatus MEMA as described below is performed.

The processor PROS allocates a second request physical address PA2-2 of the second memory chip CH2 to the first request logical address LA1-1 of the first memory chip CH1 instead of the request first physical address of the first memory chip CH1. In an embodiment, the second request logical address LA2-2 of the second memory chip CH2 is allocated to indirectly connect the first request logical address LA1-1 to the second request physical address PA2-2. Also, the processor PROS updates the first and second mapping tables MT1 and MT2, which are metadata MD loaded to the RAM. In the second mapping table MT2, the second request logical address LA2-2 of the second memory chip CH2 is updated to correspond to the second request physical address PA2-2 of the second memory chip CH2 (MT2; LA2-2: PA2-2). In the first mapping table MT1, the first request logical address LA1-1 of the first memory chip CH1 is updated to correspond to the second request logical address LA2-2 of the second memory chip CH2 (MT1; LA1-1: LA2-2). Also, the processor PROS controls the second memory controller Ctr2 to write the first data DTA1 to the second request physical address PA2-2 of the second memory chip CH2, in operation S130.

Figure 4:
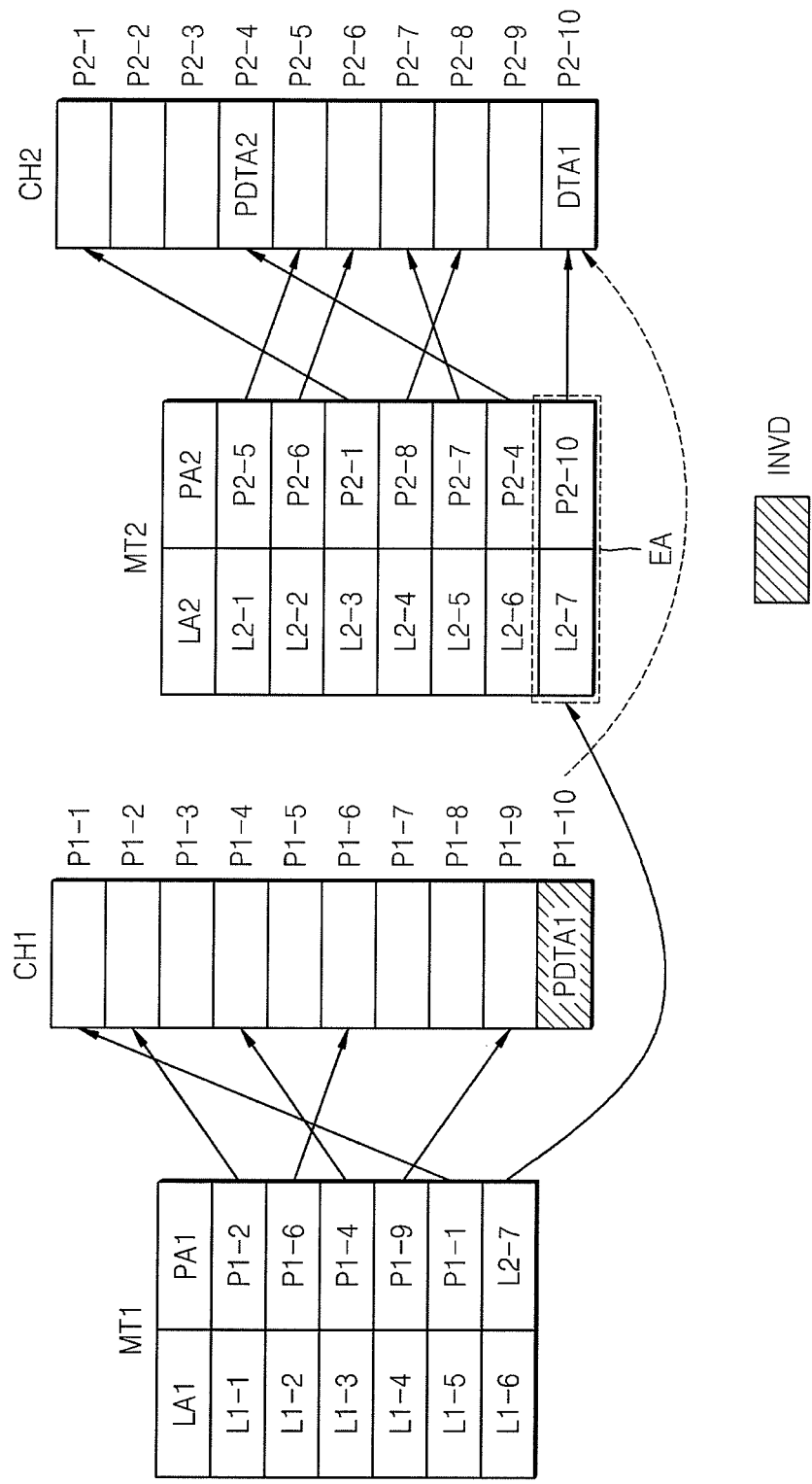
FIG. 4 illustrates an example of a plurality of memory chips included in the memory apparatus of FIG. 1 and a plurality of mapping tables updated in operation S130 of FIG. 3.

FIG. 4 illustrates an example of the first and second memory chips CH1 and CH2 included in the memory apparatus MEMA of FIG. 1 and the first and second mapping tables MT1 and MT2 updated in operation S130 of FIG. 3. It is assumed that the first and second mapping tables MT1 and MT2 of FIG. 4 are updated from the first and second mapping tables MT1 and MT2 of FIG. 2.

In FIG. 4, the second request physical address PA2-2 (for example, the tenth physical address P2-10) of the second memory chip CH2 is allocated to the first request logical address LA1-1 (for example, the sixth logical address L1-6) of the first memory chip CH1 instead of the first request physical address (for example, the tenth physical address P1-10) of the first memory chip CH1, in operation S130 of FIG. 3.

Referring to FIG. 4, the seventh logical address L2-7 is updated to correspond to the tenth physical address P2-10 of the second memory chip CH2 in the second mapping table MT2. In the first mapping table MT1, the sixth logical address L1-6 of the first memory chip CH1 is updated to correspond to the seventh logical address L2-7 of the second memory chip Ch2 instead of the tenth physical address P1-10 (refer to FIG. 2) of the first memory chip CH1. In other words, in the first mapping table MT1, a logical-logical address correspondence relationship is defined in the sixth logical address L1-6 of the first memory chip CH1 instead of the logical-physical address correspondence relationship. The first data DTA1 is written to the tenth physical address P2-10 of the second memory chip CH2.

Referring to operation S130 of FIG. 3 and FIG. 4, in the second mapping table MT2, the second request logical address LA2-2 (for example, the seventh logical address L2-7) of the second memory chip CH2 corresponds to the second request physical address PA2-2 (for example, the tenth physical address P2-10) of the second memory chip CH2. In the first mapping table MT1, the first request logical address LA1-1 (for example, the sixth logical address L1-6) of the first memory chip CH1 corresponds to the second request logical address LA2-2 (for example, the seventh logical address L2-7) of the second memory chip CH2.

In other words, in the memory apparatus MEMA according to at least one embodiment of the inventive concept, when the tenth physical address P2-10 of the second memory chip CH2 is allocated to the sixth logical address L1-6 of the first memory chip CH1, the first and second mapping tables MT1 and MT2 indirectly map the sixth logical address L1-6 of the first memory chip CH1 and the tenth physical address P2-10 of the second memory chip CH2 using the seventh logical address L2-7 of the second memory chip CH2 as a parameter. The seventh logical address L2-7 of the second memory chip CH2 is a parameter for connecting the sixth logical address L1-6 of the first memory chip CH1 to the tenth physical address P2-10 of the second memory chip CH2.

Hereinafter, when a physical address of the second memory chip CH2 is allocated to a logical address of the first memory chip CH1 in the memory apparatus MEMA according to the embodiment of the inventive concept, a method of indirectly defining the logical address of the first memory chip CH1 and the physical address of the second memory chip CH2 is referred to as an indirect mapping method.

When the sixth logical address L1-6 of the first memory chip CH1 and the tenth physical address P2-10 of the second memory chip CH2 are defined by the indirect mapping method, the logical-physical address correspondence relationship (metadata) used to access the tenth physical address P2-10 of the second memory chip CH2 is defined in the second mapping table MT2. The second mapping table MT2 is stored in the second memory chip CH2 (refer to FIG. 1). Accordingly, when the indirect mapping method is used, metadata of each of the first and second memory chips CH1 and CH2 may be stored in each of the first and second memory chips CH1 and CH2.

In FIG. 4, the seventh logical address L2-7 of the second memory chip CH2, which is a parameter, may be included in an extended area EA of the second mapping table MT2. The extended area EA is an area where an additional logical-physical address correspondence relationship may be defined in the first and second mapping tables MT1 and MT2. In FIG. 4, the extended area EA of the second mapping table MT2 includes the seventh logical address L2-7. However, the inventive concept is not limited thereto, as a logical address included in the extended area EA may have a different value and several logical addresses may be present in the extended area EA.

In comparison between FIG. 2 and FIG. 4, the seventh logical address L2-7 of the second memory chip CH2 is not in the second mapping table MT2 of FIG. 2. In other words, the extended area EA may be dynamically allocated to the first and second mapping tables MT1 and MT2. However, the inventive concept is not limited thereto, as the extended area EA may be statically allocated to the first and second mapping tables MT1 and MT2. Also, in an exemplary embodiment, the extended area EA is not allocated to mapping tables. For example, a reserved area in the mapping tables may be used as the extended area EA.

Referring back to FIGS. 3 and 4, the first primary data PDTA1 stored in the tenth physical address P1-10 of the first memory chip CH1 becomes invalid data INVD due to a write of the first data DTA1. Hereinafter, a page, to which new data may not be written since the invalid data INVD is stored, is referred to as an invalid page.

The invalid page may be deleted by electrically erasing a block including the invalid page. Hereinafter, deletion of an invalid page is referred to as garbage collection.

In other words, the first primary data PDTA1, which is the invalid data INVD, may be deleted through the garbage collection.

Referring back to FIGS. 1 and 3, the processor PROS receives a second write request, in operation S140. The second write request includes the first request logical address LA 1-1 of the first memory chip CH1 and second data DTA2. Since the first data DTA1 is written to the second request physical address PA2-2 of the second memory chip CH2 allocated to the first request logical address LA1-1 of the first memory chip CH1 in operation S130, the first data DTA1 may be updated to the second data DTA2 in the first request logical address LA1-1 of the first memory chip CH1 due to the second write request in operation S140.

In operation S150, the processor PROS allocates a third request physical address PA2-3 of the second memory chip CH2 to the first request logical address LA1-1 of the first memory chip CH1, instead of the second request physical address PA2-2 of the second memory chip CH2 and updates the second mapping table MT2, which is the metadata MD loaded to the RAM. In the second mapping table MT2, the second request logical address LA2-2 of the second memory chip CH2 is updated to correspond to the third request physical address PA2-3 of the second memory chip CH2, instead of the second request physical address PA2-2 of the second memory chip CH2 (MT2; LA2-2: PA2-3). Here, the first mapping table MT1 is not changed. Also, the processor PROS controls the second memory controller Ctr2 to write the second data DTA2 to the third request physical address PA2-3 of the second memory chip CH2, in operation S150.

Figure 5:
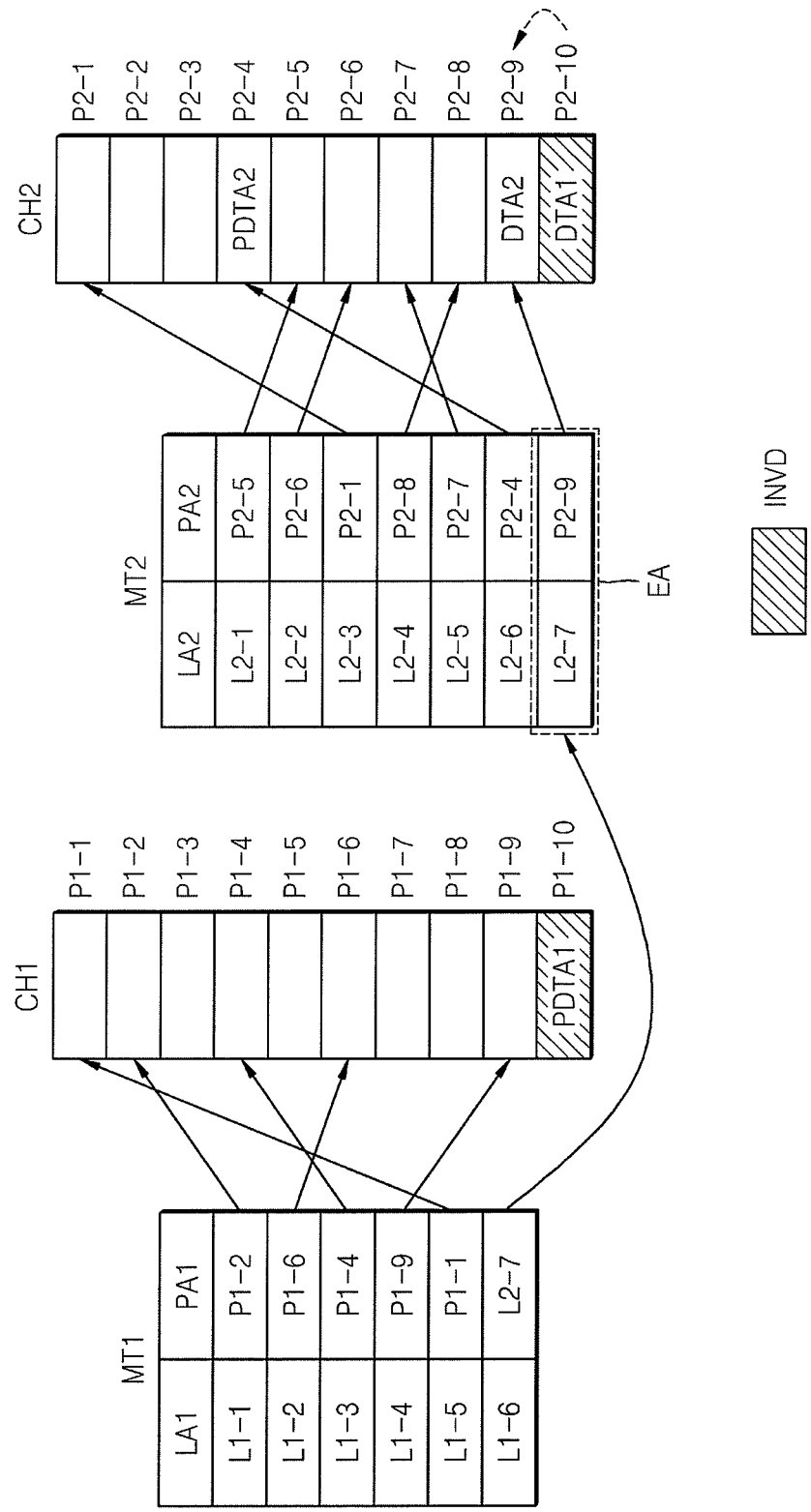
FIG. 5 illustrates an example of a plurality of memory chips included in the memory apparatus of FIG. 1 and a plurality of mapping tables updated in operation S150 of FIG. 3.

FIG. 5 illustrates an example of the first and second memory chips CH1 and CH2 included in the memory apparatus MEMA of FIG. 1 and the first and second mapping tables MT1 and MT2 updated in operation S150 of FIG. 3. It is assumed that the first and second mapping tables MT1 and MT2 of FIG. 5 are updated from the first and second mapping tables MT1 and MT2 of FIG. 4.

In FIG. 5, the third request physical address PA2-3 (for example, a ninth physical address P2-9) of the second memory chip CH2 is allocated to the first request logical address LA 1-1 (for example, the sixth logical address L1-6) of the first memory chip CH1, instead of the second request physical address PA2-2 (for example, the tenth physical address P2-10) of the second memory chip CH2, in operation S150 of FIG. 3.

Referring to FIG. 5, the seventh logical address L2-7 of the extended area EA in the second mapping table MT2 is updated to correspond to the ninth physical address P2-9 of the second memory chip CH2, instead of the tenth physical address P2-10 (refer to FIG. 4) of the second memory chip CH2. Here, the first mapping table MT1 is not changed. In other words, the first mapping table MT1 of FIG. 5 is the same as the first mapping table MT1 of FIG. 4. The second data DTA2 is written to the ninth physical address P2-9 of the second memory chip CH2 and the first data DTA1 stored in the tenth physical address P2-10 of the second memory chip CH2 becomes the invalid data INVD.

Referring to operation S150 of FIG. 3 and FIG. 5, in the second mapping table MT2, the second request logical address LA2-2 (for example, the seventh logical address L2-7) of the second memory chip CH2 corresponds to the third request physical address PA2-3 (for example, the ninth physical address P2-9) of the second memory chip CH2. In the first mapping table MT1, which is not changed, the first request logical address LA 1-1 (for example, the sixth logical address L1-6) of the first memory chip CH1 corresponds to the second request logical address LA2-2 (for example, the seventh logical address L2-7) of the second memory chip CH2. Accordingly, the first and second mapping tables MT1 and MT2 indirectly map the sixth logical address L1-6 of the first memory chip CH1 and the ninth physical address P2-9 of the second memory chip CH2 using the seventh logical address L2-7 of the second memory chip CH2 as a parameter.

In the memory apparatus MEMA according to at least one embodiment of the inventive concept, if the indirect mapping method is used when the first and second memory chips CH1 and CH2 are mapped with each other, the first mapping table MT1 is not changed and only the second mapping table MT2 needs to be updated after the tenth physical address P2-10 of the second memory chip CH2 is allocated to the sixth logical address L1-6 of the first memory chip CH1 (refer to FIG. 4) and when the ninth physical address P2-9 of the second memory chip CH2 is newly allocated to the sixth logical address L1-6 of the first memory chip CH1 (refer to FIG. 5). The metadata of each of the first and second memory chips CH1 and CH2 may be stored in each of the first and second mapping tables MT1 and MT2 through the indirect mapping method.

In other words, the memory apparatus MEMA may only need to access the second memory chip CH2 to write the second data DTA2 without updating the changed first mapping table MT1 to the first memory chip CH1. Accordingly, data processing time in the memory apparatus MEMA may be prevented from being delayed and the performance of the memory apparatus MEMA may be improved.

Referring back to FIGS. 1 and 3, when it is determined that the first and second memory chips CH1 and CH2 are not mapped with each other, operation S160 of the memory apparatus MEMA is performed as described below.

The processor PROS allocates a fourth request physical address PA1-4 of the first memory chip CH1 to the first request logical address LA1-1 of the first memory chip CH1, instead of the first request physical address of the first memory chip CH1. Also, the processor PROS updates the first request logical address LA1-1 of the first memory chip CH1 in the first mapping table MT1 to correspond to the fourth request physical address PA1-4 of the first memory chip CH1, instead of the first request physical address of the first memory chip CH1. In addition, the processor PROS controls the first memory controller Ctr1 to write the first data DTA1 to the fourth request physical address PA1-4 of the first memory chip CH1, in operation S160.

After operation S160, when the processor PROS receives a new write request for the first request logical address LA1-1, operations of the memory apparatus MEMA are repeated from operation S110.

Figure 6:
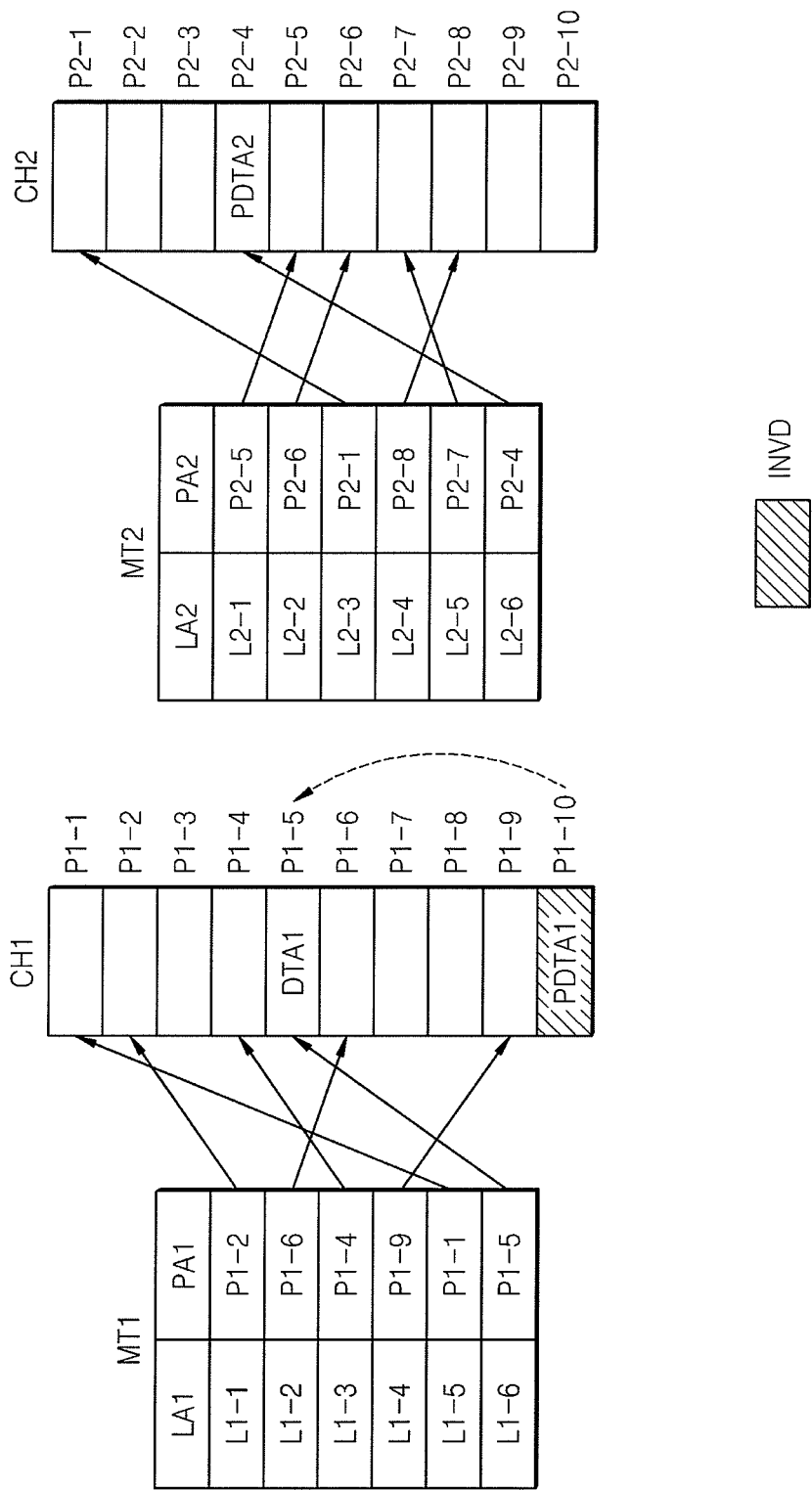
FIG. 6 illustrates an example of a plurality of memory chips included in the memory apparatus of FIG. 1 and a plurality of mapping tables updated in operation S160 of FIG. 3.

FIG. 6 illustrates an example of the first and second memory chips CH1 and CH2 included in the memory apparatus MEMA of FIG. 1 and the first and second mapping tables MT1 and MT2 updated in operation S160 of FIG. 3. It is assumed that the first and second mapping tables MT1 and MT2 of FIG. 6 are updated from the first and second mapping tables MT1 and MT2 of FIG. 2.

In FIG. 6, the fourth request physical address PA1-4 (for example, a fifth physical address P1-5) of the first memory chip CH1 is allocated to the first request logical address LA 1-1 (for example, the sixth logical address L1-6) of the first memory chip CH1, instead of the first request physical address (for example, the tenth physical address P1-10) of the first memory chip CH1, in operation S160 of FIG. 3.

Referring to FIG. 6, the sixth logical address L1-6 of the first memory chip CH1 in the first mapping table MT1 is updated to correspond to the fifth physical address P1-5 of the first memory chip CH1, instead of the tenth physical address P1-10 (refer to FIG. 2) of the first memory chip CH1. The first data DTA1 is written to the fifth physical address P1-5 of the first memory chip CH1 and the first primary data PDTA1 stored in the tenth physical address P1-10 of the first memory chip CH1 becomes the invalid data INVD.

As described above, a new physical address is allocated to the sixth logical address L1-6 of the first memory chip CH1 due to the repeated write requests (operations S110 and S140 of FIG. 3) for the sixth logical address L1-6 (the first request logical address LA1-1 of FIG. 3) of the first memory chip CH1 in FIGS. 3 through 6.

However, a new physical address may be allocated to the sixth logical address L1-6 of the first memory chip CH1 in some examples other than the repeated write requests. For example, when a block corresponding to a physical address indicated by the sixth logical address L1-6 of the first memory chip CH1 is a bad block, a new physical address needs to be allocated to the sixth logical address L1-6 of the first memory chip CH1. The bad block may not properly perform a data write operation or an electrical erase operation. The bad block may be generated when manufacturing the memory apparatus or when continuously using the memory apparatus.

When a new physical address needs to be allocated to the sixth logical address L1-6 of the first memory chip CH1, the first and second memory chips CH1 and CH2 may be mapped with each other. Also, when the first and second memory chips CH1 and CH2 are mapped with each other, the indirect mapping method may be used.

In other words, the indirect mapping method described with reference to FIGS. 3 through 6 may be applied to various examples when a new physical address needs to be allocated to the sixth logical address L1-6 of the first memory chip CH1.

Figure 7:
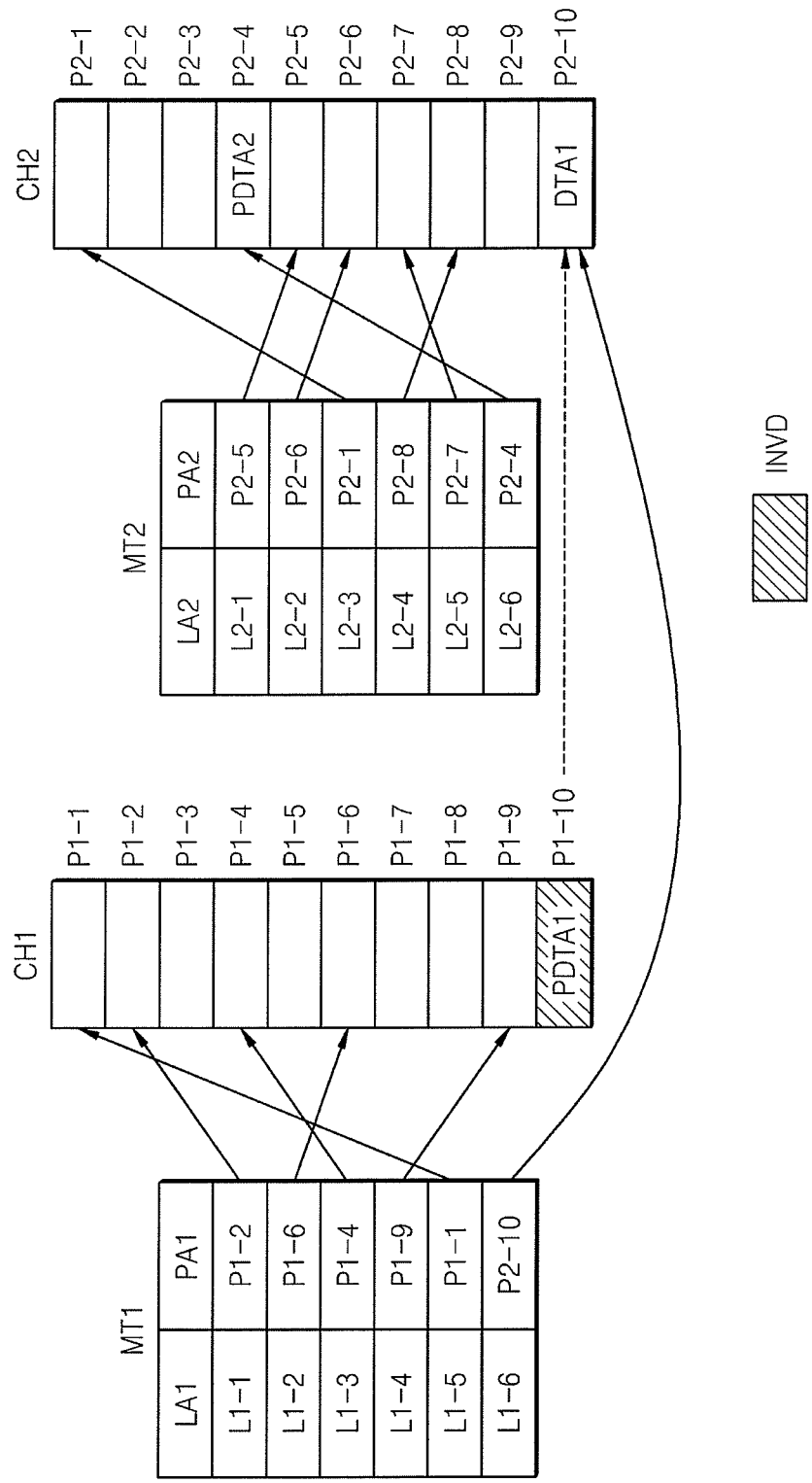
FIGS. 7 and 8 illustrate an example of a plurality of memory chips and a plurality of mapping tables when a direct mapping method is used instead of an indirect mapping method in the memory apparatus of FIG. 1.
Figure 8:
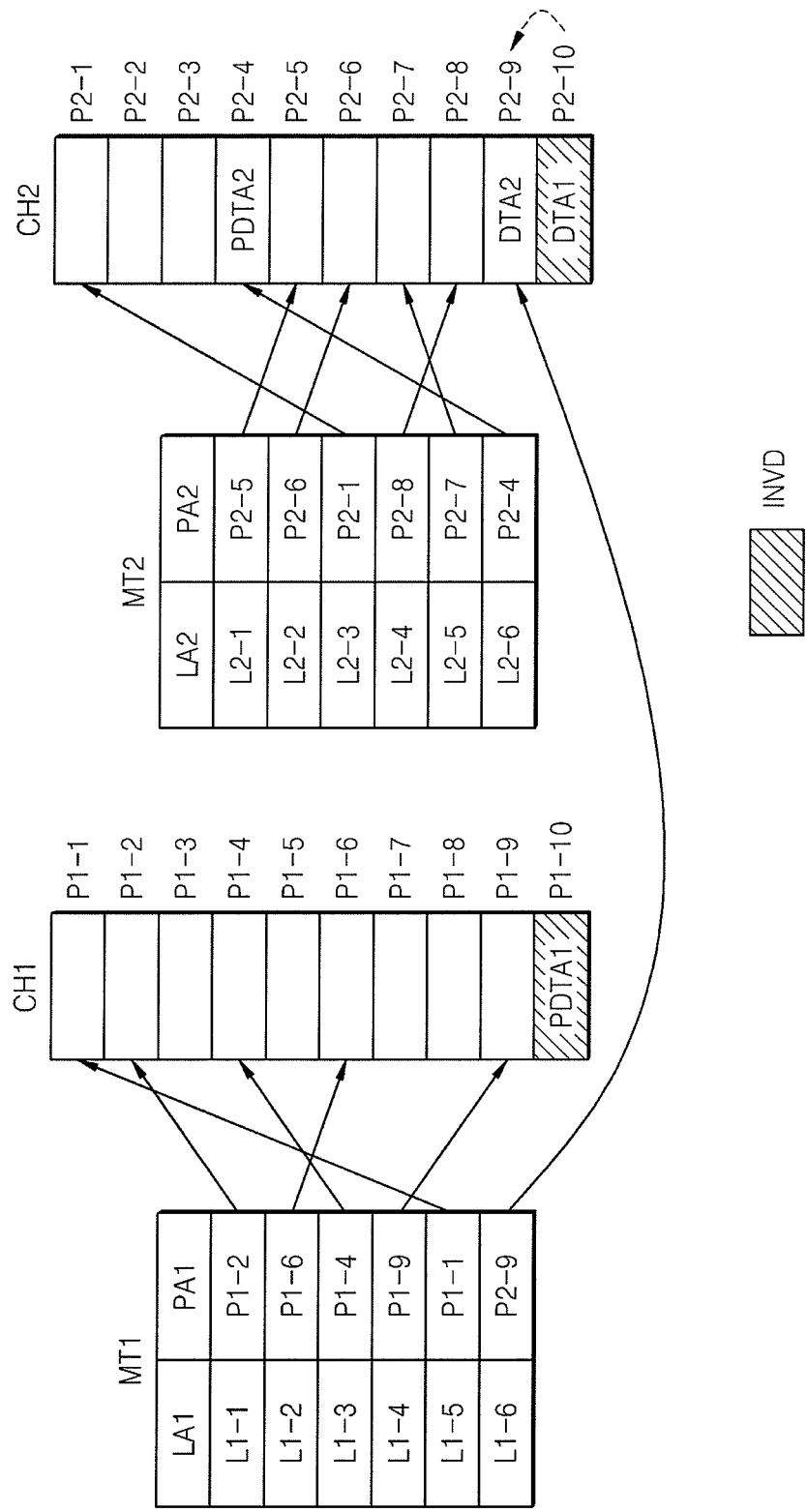

FIGS. 7 and 8 illustrate an example of the first and second memory chips CH1 and CH2 and the first and second mapping tables MT1 and MT2 when a direct mapping method, instead of the indirect mapping method, is used in the memory apparatus according to an exemplary embodiment of the inventive concept.

In FIG. 7, it is assumed that the first and second mapping tables MT1 and MT2 are previously defined as in FIG. 2 and first and second primary data PDTA1 and PDTA2 are previously stored in the first and second memory chips CH1 and CH2, respectively. In FIG. 7, it is assumed that a first write request to write the first data DTA1 to the sixth logical address L1-6 of the first memory chip CH1 is generated. Also, in FIG. 7, it is assumed that the tenth physical address P2-10 of the second memory chip CH2 is allocated to the sixth logical address L1-6 of the first memory chip CH1 due to the first write request, instead of the tenth physical address P1-10 of the first memory chip CH1. In other words, the assumption of FIG. 7 is the same as that of FIG. 4.

Referring to FIG. 7, the sixth logical address L1-6 of the first memory chip CH1 is updated to correspond to the tenth physical address P2-10 of the second memory chip CH2, instead of the tenth physical address P1-10 (refer to FIG. 2) of the first memory chip CH1, in the first mapping table MT1. Here, the second mapping table MT2 is not changed. The first data DTA1 is written to the tenth physical address P2-10 of the second memory chip CH2 and the first primary data PDTA1 stored in the first memory chip CH1 becomes the invalid data INVD.

When the direct mapping method is used, the logical-physical address correspondence relationship (metadata) required to access the tenth physical address P2-10 of the second memory chip CH2 is defined in the first mapping table MT1. The first mapping table MT1 is stored in the first memory chip CH1 (Refer to FIG. 1). Accordingly, when the direct mapping method is used, metadata of each of the first and second memory chips CH1 and CH2 is not stored in each of the first and second memory chips CH1 and CH2.

In FIG. 8, it is assumed that the first and second mapping tables MT1 and MT2 are previously defined as in FIG. 7, and the first and second primary data PDTA1 and PDTA2 and the first data DTA1 are previously stored in the first and second memory chips CH1 and CH2. In FIG. 8, it is assumed that a second write request to write the second data DTA2 to the sixth logical address L1-6 of the first memory chip CH1 is generated. Also, in FIG. 8, it is assumed that the ninth physical address P2-9 of the second memory chip CH2 is allocated to the sixth logical address L1-6 of the first memory chip CH1 due to the second write request, instead of the tenth physical address P2-10 of the second memory chip CH2. In other words, the assumption of FIG. 8 is the same as that of FIG. 5.

Referring to FIG. 8, the sixth logical address L1-6 of the first memory chip CH1 is updated to correspond to the ninth physical address P2-9 of the second memory chip CH2, instead of the tenth physical address P2-10 (refer to FIG. 7) of the second memory chip CH2, in the first mapping table MT1. Here, the second mapping table MT2 is not changed. The second data DTA2 is written to the ninth physical address P2-9 of the second memory chip CH2 and the first data DTA1 stored in the second memory chip CH2 becomes the invalid data INVD.

When the first and second mapping tables MT1 and MT2 are updated as in FIG. 8, a processor of the memory apparatus controls a memory controller to access the first memory chip CH1 so as to store the updated first mapping table MT1 and to access the second memory chip CH2 so as to write the second data DTA2.

When the direct mapping method is used in the memory apparatus, instead of the indirect mapping method, the memory apparatus may access two memory chips for one logical address change. When the direct mapping method is used, metadata of each of the first and second memory chips CH1 and CH2 is not stored in each of the first and second memory chips CH1 and CH2. In this example, interference between the two memory chips, which may each perform independent operation, may occur, and due to such the interference, one memory chip may need to wait for the other memory chip to complete operations. Also, as the number of memory chips included in the memory apparatus increases, access to the memory chips makes operations of the memory apparatus more complicated. Also, when a memory management operation such as merge or garbage collection is performed, the complexity of the memory management operation increases due to the direct mapping method when the memory apparatus needs to access the memory chips. Accordingly, when the direct mapping method is used, the performance of the memory apparatus may decrease.

In a memory apparatus according to at least one embodiment of the inventive concept, when the memory chips are mapped with each other, the indirect mapping method is used so that the data processing time in the memory apparatus may be prevented from being delayed and the performance of the memory apparatus may increase. Also, in the memory apparatus according to at least one embodiment of the inventive concept, interference between the memory chips may be minimized and the mapping tables may be efficiently managed.

Hereinafter, a method of determining mapping between memory chips will be described according to an exemplary embodiment of the inventive concept.

The mapping between the memory chips may be generated due to a capacity limitation of each memory chip. For example, the memory chips may be mapped with each other due to a bad block, which may be referred to as global bad block management (GBBM). Through the GBBM, bad blocks may be prevented from being excessively generated in a specific chip from among the memory chips.

As another example, the memory chips may be mapped with each other due to wear leveling, which is called a global wear leveling.

Each block of a flash memory has a limited lifetime during which data may be written in the each block. The lifetime is closely related to the number of electrical erase operation performed on blocks. When the number of electrical erase operations increases above a predetermined amount, an obstacle to writing data may be generated. The upper limit of the number of electrical erase operations is generally between a hundred thousand and one million times and may vary according to the type of flash memory used or the manufacturer used to manufacture the flash memory. Hereinafter, the number of electrical erase operation performed is referred to as a wear count. Also, wear leveling prevents the electrical erase operation from being repeatedly performed for only a specific block and levelly maintains the lifetime of all blocks by uniformly using and electrically erasing all blocks. Through the global wear leveling, wearing of a specific chip from among the memory chips may be prevented from being excessively increased.

The occurrence of the mapping between the memory chips due to the GBBM and/or global wear leveling is described with reference to FIG. 9.

Figure 9:
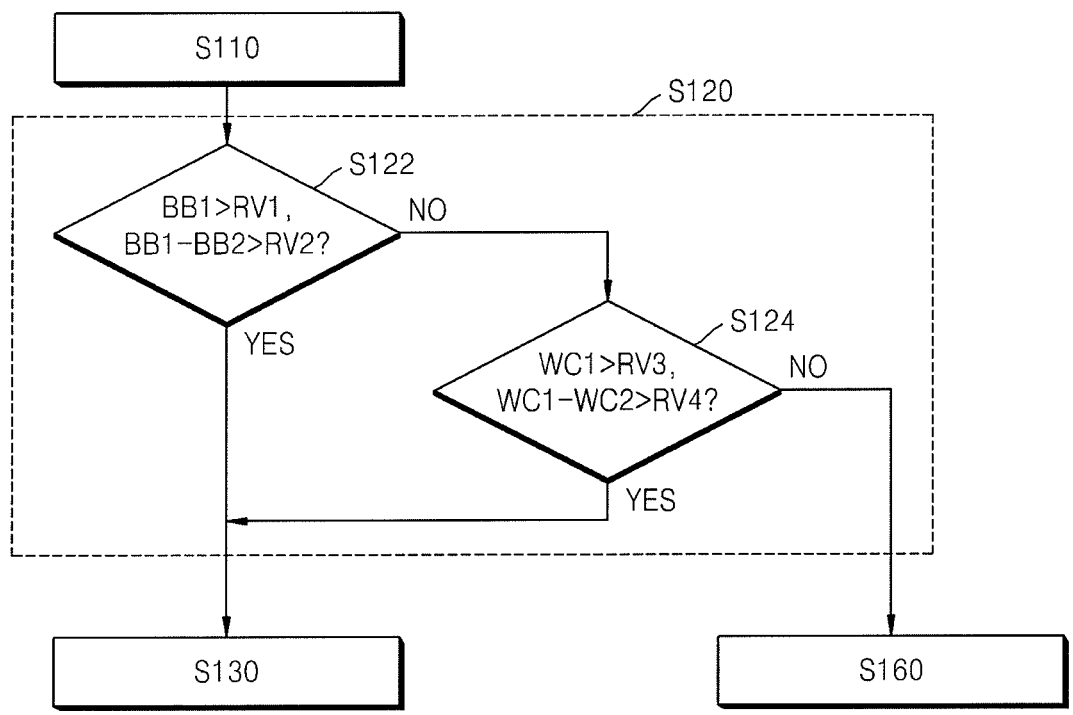
FIG. 9 is an example of a flowchart illustrating a method of determining whether to map between a plurality of memory chips in operation S120 of FIG. 3 according to an exemplary embodiment of the inventive concept.

FIG. 9 is a flowchart illustrating a method of determining whether to map between the first and second memory chips CH1 and CH2 according to an exemplary embodiment of the invention, which may be used in operation S120 of FIG. 3.

Referring to FIGS. 1, 3, and 9, a new physical address, instead of the first request physical address, needs to be allocated to the first request logical address LA1-1 of the first memory chip CH1 due to operation S110. In an embodiment, the processor PROS of the memory apparatus MEMA determines whether to map between the first and second memory chips CH1 and CH2, in operation S120 to allocate a new physical address to the first request logical address LA 1-1 of the first memory chip CH1.

Determining whether to map between the first and second memory chips CH1 and CH2, in operation S120, may include performing a determination based on the number of first bad blocks BB1 of the first memory chip CH1 and the number of second bad blocks BB2 of the second memory chip CH2, in operation S122, and performing a determination based on a first wear count WC1 of the first memory chip CH1 and second wear count WC1 of the second memory chip CH2, in operation S124.

The processor PROS compares the number of first bad blocks BB1 of the first memory chip CH1 with a first reference value RV1 and compares a value obtained by subtracting the number of second bad blocks BB2 from the number of first bad blocks BB1 with a second reference value RV2, in operation S122.

When the number of first bad blocks BB1 is not greater than the first reference value RV1 or when the value obtained by subtracting the number of second bad blocks BB2 from the number of first bad blocks BB1 is not greater than the second reference value RV2, the processor PROS compares the first wear count WC1 with a third reference value RV3 and compares a value obtained by subtracting the second wear count WC2 from the first wear count WC1 with a fourth reference value RV4, in operation S124. Each of the first through fourth reference values RV1 through RV4 may be set variously according to capacities of the first memory chip CH1 and the second memory chip CH2, etc.

When the number of first bad blocks BB1 is greater than the first reference value RV1 (BB1>RV1) and when the value obtained by subtracting the number of second bad blocks BB2 from the number of first bad blocks BB1 is greater than the second reference value RV2 (BB1−BB2>RV2), the first and second memory chips CH1 and CH2 are mapped with each other and thus the memory apparatus MEMA performs operation S130 described with reference to FIG. 3.

Also, when the first wear count WC1 is greater than the third reference value RV3 (WC1>RV3) and when the value obtained by subtracting the second wear count WC2 from the first wear count WC1 is greater than the fourth reference value RV4 (WC1−WC2>RV4), the first and second memory chips CH1 and CH2 are mapped with each other and thus the memory apparatus MEMA performs operation S130 described with reference to FIG. 3.

When the number of first bad blocks BB1 is not greater than the first reference value RV1, when the value obtained by subtracting the number of second bad blocks BB2 from the number of first bad blocks BB1 is not greater than the second reference value RV2, when the first wear count WC1 is not greater than the third reference value RV3, or when the value obtained by subtracting the second wear count WC2 from the first wear count WC1 is not greater than the fourth reference value RV4, the first and second memory chips CH1 and CH2 are not mapped with each other and the memory apparatus MEMA performs operation S160 described with reference to FIG. 3.

However, operations S122 and S124 in FIG. 9 are only examples as one of the two operations may be omitted or the order of two operations may be changed. For example, when the number of first bad blocks BB1 is not greater than the first reference value RV1, the method may proceed to operation S160, without performing operation S124.

Figure 10:
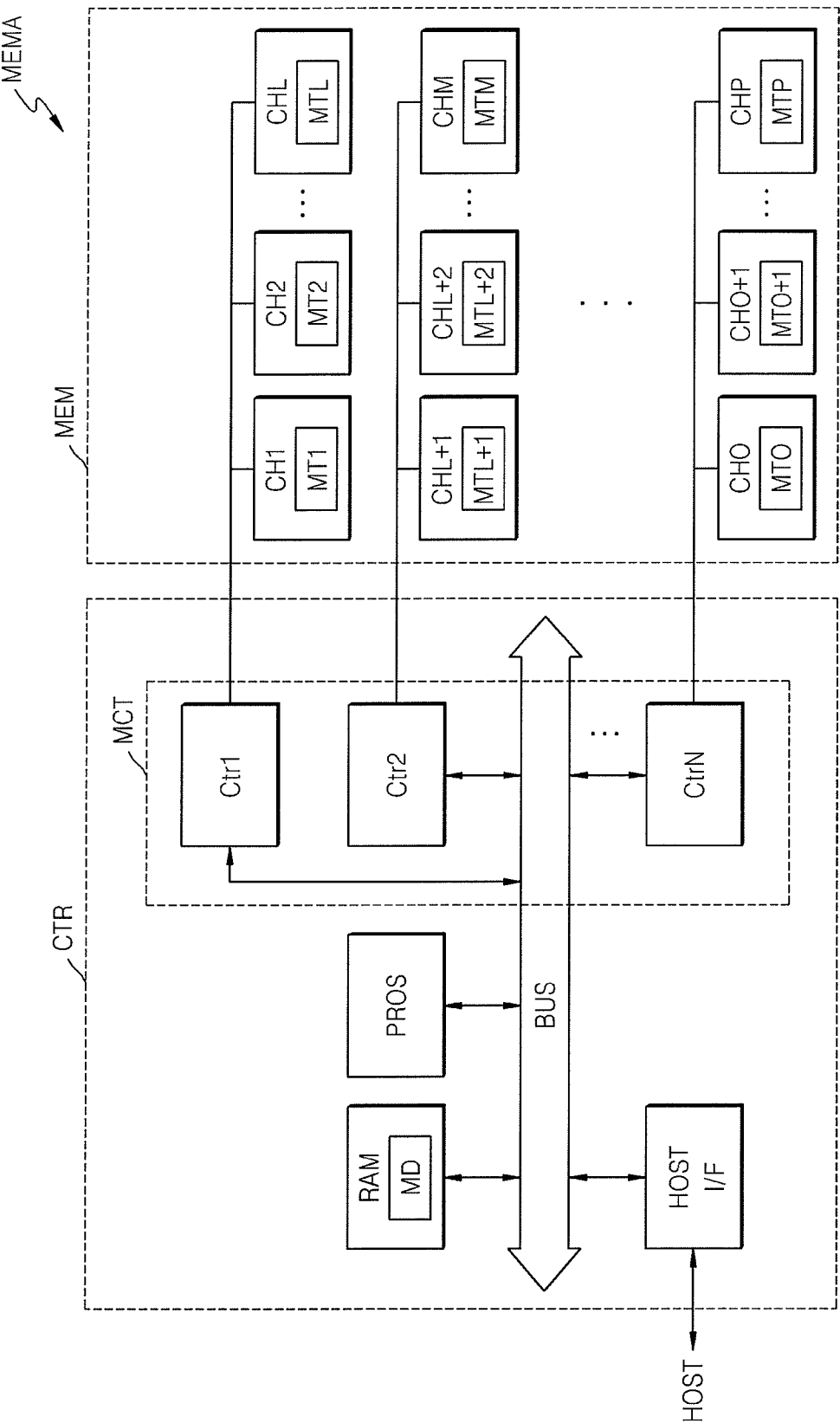
FIG. 10 is a block diagram of a memory apparatus according to an exemplary embodiment of the inventive concept.

FIG. 10 is a block diagram of the memory apparatus MEMA according to an exemplary embodiment of the inventive concept.

Referring to FIG. 10, the memory apparatus MEMA includes a memory MEM and a control unit CTR. The memory MEM includes a plurality of memory chips CH1 through CHP (P is a natural number). The plurality of memory chips CH1 through CHP may each be a flash memory.

The control unit CTR may include a host interface HOST I/F, a processor PROS, a RAM, and a memory controller unit MCT that are electrically connected to each other by a bus BUS.

In comparison between FIG. 1 and FIG. 10, the memory apparatus MEMA of FIG. 1 may be extended so that the number of memory chips is greater than 2 as in the memory chips CH1 through CHP in the memory apparatus MEMA of FIG. 10.

A plurality of memory controllers Ctr1 through CtrN (N is a natural number) included in the memory controller unit MCT are each connected to the plurality of memory chips CH1 through CHP. For example, the second memory controller Ctr2 is electrically connected to the plurality of memory chips CHL+1 through CHM (L and M are natural numbers). However, FIG. 10 is merely an example, as the number of memory controllers and the number of memory chips connected to one memory controller may be variously changed. Further, while FIG. 10 shows one of the memory controllers connected to a row of the memory chips, embodiments of the invention are not limited thereto. For example, one of the memory controllers can be connected to a column of the memory chips, or any number of un-related memory chips.

The indirect mapping method described above may be applied to examples where a physical address of another memory chip is allocated to a logical address of one memory chip from among the plurality of memory chips CH1 through CHP.

A memory apparatus including a plurality of memory chips described above may be included in an electronic apparatus. For example, the electronic apparatus may be a computing system apparatus, a server computer, a digital camera, a camcorder, or a mobile phone.

Figure 11:
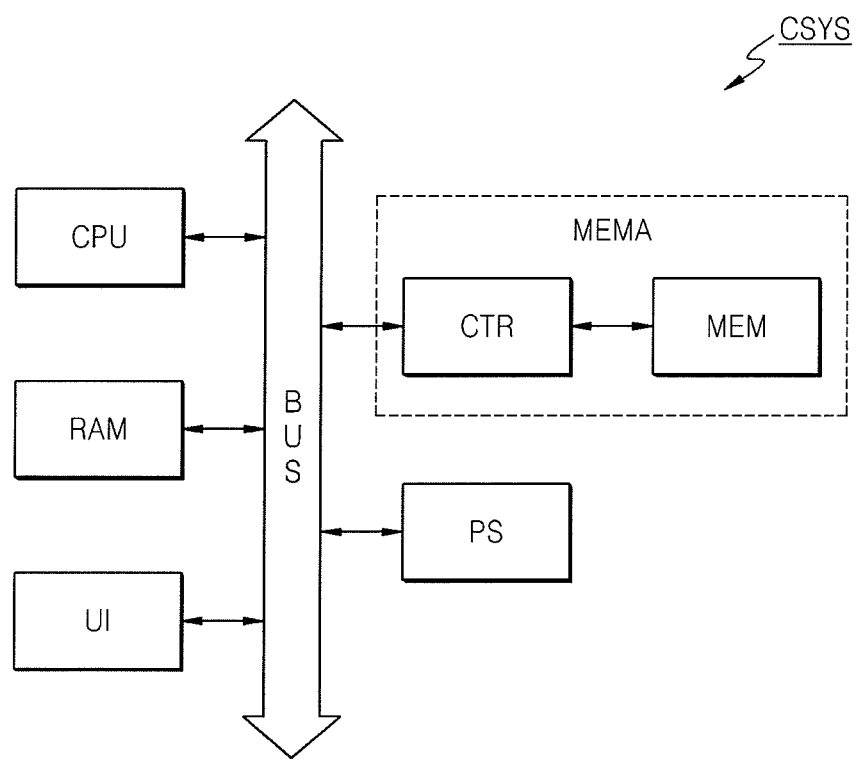
FIG. 11 is a block diagram of a computing system apparatus including a memory apparatus according to an exemplary embodiment of the inventive concept.

FIG. 11 is a block diagram of a computing system apparatus CSYS including a memory apparatus MEMA according to an exemplary embodiment of the inventive concept.

Referring to FIG. 11, the computing system apparatus CSYS includes a central processing unit (CPU), a user interface UI, and the memory apparatus MEMA which are electrically connected to the bus BUS. The memory apparatus MEMA includes the control unit CTR and the memory MEM. The memory MEM includes a plurality of memory chips. When the plurality of memory chips are mapped with each other, the indirect mapping method may be used. The indirect mapping method is described above. The memory apparatus MEMA of FIG. 11 may be the memory apparatus MEMA of FIG. 1 or FIG. 10.

The computing system apparatus CSYS may further include a power supply apparatus PS. The power supply apparatus PS may supply power to at least one of the other illustrated devices. Also, the computing system apparatus CSYS may further include a system memory (for example, RAM).

When the computing system apparatus CSYS is a mobile apparatus, a battery for supplying a driving voltage of the computing system apparatus CSYS and a modem such as a baseband memory chipset may be additionally provided. Although not shown in FIG. 11, the computing system apparatus CSYS may include a camera image processor (CIS) in addition to or instead of the CPU or, and a mobile DRAM in addition to or instead of the RAM.

Figure 12:
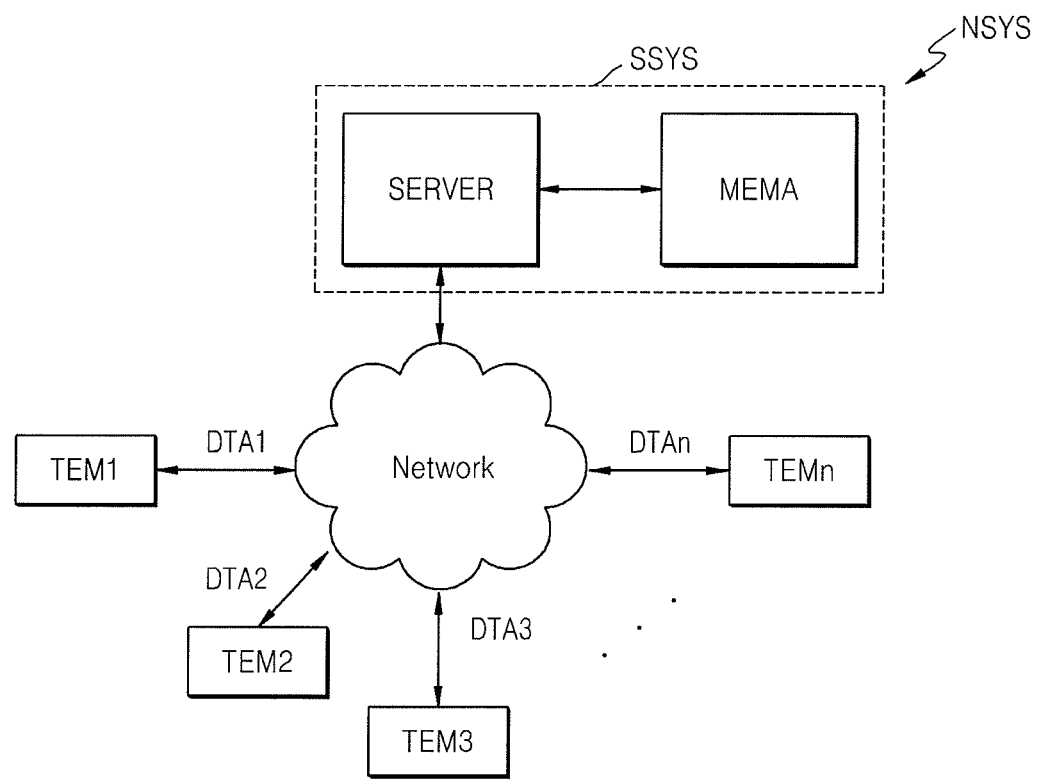
FIG. 12 is a block diagram of a network system including a memory apparatus according to an exemplary embodiment of the inventive concept.

FIG. 12 is a block diagram of a network system NSYS including a memory apparatus MEMA according to an exemplary embodiment of the inventive concept.

Referring to FIG. 12, the network system NSYS includes a server system SSYS and a plurality of terminals TEM1 through TEMn, which are electrically connected through a network. The server system SSYS may include a server SERVER and the memory apparatus MEMA, wherein the server SERVER processes requests received from the plurality of terminals TEM1 through TEMn and the memory apparatus MEMA stores data DTA1 through DTAn that correspond to the requests received from the plurality of terminals TEM1 through TEMn. The memory apparatus MEMA may includes a plurality of memory chips. When the plurality of memory chips are mapped with each other, the indirect mapping method may be used. The indirect mapping method is described above. The memory apparatus MEMA of FIG. 12 may be the memory apparatus MEMA of FIG. 1 or FIG. 10.

While the inventive concept has been particularly shown and described with reference to exemplary embodiments thereof, it will be understood that various changes in form and details may be made therein without departing from the spirit and scope of the disclosure.

What is claimed is:

1. A memory apparatus comprising:
 a first memory chip and a second memory chip; and
 a control unit configured to manage a first mapping table for the first memory chip and a second mapping table for the second memory chip,
 wherein the first memory chip includes a plurality of physical blocks,
 wherein the second memory chip includes a plurality of physical blocks,
 wherein the control unit is configured to allocate a first physical address of the second memory chip to a first logical address in the first mapping table for the first memory chip by updating a second logical address in the second mapping table for the second memory chip to correspond to the first physical address of the second memory chip and updating the first logical address in the first mapping table for the first memory chip to correspond to the second logical address in the second mapping table for the second memory chip.

2. The memory apparatus of claim 1, wherein the first mapping table is stored in the first memory chip and the second mapping table is stored in the second memory chip.

3. The memory apparatus of claim 2, wherein the control unit comprises:
 a RAM configured to store the first mapping table and the second mapping table;
 a processor configured to update the first mapping table and the second mapping table both stored within the RAM; and
 a memory controller unit connected to the first memory chip and the second memory chip.

4. The memory apparatus of claim 3, wherein when the controller unit allocates the first physical address of the second memory chip to the first logical address in the first mapping table for the first memory chip and then a read request for the first logical address in the first mapping table for the first memory chip is generated, the processor is configured to change the first logical address in the first mapping table for the first memory chip to the first physical address of the second memory chip based on the first mapping table and the second mapping table both being stored to the RAM and control the memory controller unit to access the first physical address of the second memory chip to perform the read request.

5. The memory apparatus of claim 3, wherein when the controller unit allocates the first physical address of the second memory chip to the first logical address in the first mapping table for the first memory chip and then a write request for the first logical address in the first mapping table for the first memory chip is generated, the processor is configured to allocate a second physical address of the second memory chip to the first logical address in the first mapping table for the first memory chip and update the second logical address in the second mapping table for the second memory chip to correspond to the second physical address of the second memory chip.

6. The memory apparatus of claim 5, wherein the processor is configured to control the memory controller unit to access the second physical address of the second memory chip and to perform the write request on the second physical address.

7. The memory apparatus of claim 6, wherein the memory controller unit comprises:
 a first memory controller connected to the first memory chip; and
 a second memory controller connected to the second memory chip.

8. The memory apparatus of claim 1, wherein the control unit is configured to determine a mapping between the first memory chip and the second memory chip and then allocate the first physical address of the second memory chip to the first logical address in the first mapping table for the first memory chip.

9. The memory apparatus of claim 8, wherein when a number of first bad blocks of the first memory chip is greater than a first reference value and a value obtained by subtracting a number of second bad blocks of the second memory chip from the number of first bad blocks is greater than a second reference value, the control unit allocates the first physical address of the second memory chip to the first logical address in the first mapping for the first memory chip.

10. The memory apparatus of claim 8, wherein when a first wear count of the first memory chip is greater than a first reference value and a value obtained by subtracting a second wear count of the second memory chip from the first wear count of the first memory chip is greater than a second reference value, the control unit allocates the first physical address of the second memory chip to the first logical address in the first mapping table for the first memory chip.

11. An electronic apparatus comprising:
 a memory comprising a first memory chip and a second memory chip; and
 a control unit configured to control the memory,
 wherein the first memory chip includes a plurality of physical blocks,
 wherein the second memory chip includes a plurality of physical blocks,
 wherein the control unit is configured to allocate a first physical address of the second memory chip to a first logical address in a first mapping table for the first memory chip,
 wherein the control unit is configured to allocate a second logical address in a second mapping table for the second memory chip as a parameter for indirectly mapping the first logical address in the first mapping table for the first memory chip to the first physical address and indirectly mapping the first physical address of the second memory chip to the first logical address in the first mapping table for the first memory chip based on the second logical address in the first mapping table and the second mapping table.

12. The electronic apparatus of claim 11, wherein the second logical address in the second mapping table for the second memory chip corresponds to the first physical address of the second memory chip in the second mapping table and the first logical address in the first mapping table for the first memory chip corresponds to the second logical address in the second mapping table for the second memory chip.

13. The electronic apparatus of claim 12, wherein the memory is a flash memory.

14. The electronic apparatus of claim 13, wherein the memory is included in a solid state drive.

15. The electronic apparatus of claim 14, wherein the memory is included in a server.

16. A memory apparatus comprising:
a first memory chip comprising a plurality of physical blocks and a first mapping table for the first memory chip,
wherein the first mapping table comprises a first entry including a first logical address mapping to a first physical address of the first memory chip; and
a second memory chip comprising a plurality of physical blocks and a second mapping table for the second memory chip; and
a controller unit configured to process a write request including the first logical address and data by performing a first operation that adds a second entry to the second mapping table that comprises a second logical address mapping to a second physical address of the second memory chip, changes the first entry to map the first logical address to the second logical address, and writes the data to the second physical address.

17. The memory apparatus of claim 16, wherein the controller unit is configured to process a subsequent read request including the first logical address by accessing the first entry using the first logical address as an index to determine the second logical address, accessing the second entry using the second logical address as an index to determine the second physical address, and reading the data from the second physical address.

18. The memory apparatus of claim 16, wherein the controller unit is configured to process a subsequent write request including the first logical address and second data by accessing the first entry using the first logical address as an index to determine the second logical address, accessing the second entry using the second logical address as an index, changing the second entry to map to a third physical address of the second memory chip, and writing the second data to the third physical address.

19. The memory apparatus of claim 18, wherein the controller unit frees memory associated with the second physical address.

20. The memory apparatus of claim 16,
wherein the controller unit performs the first operation when only when a number of bad blocks or a wear count value of the first memory chip is above a reference value, and
otherwise performs a second operation that allocates a fourth physical address of the first memory chip, changes the first entry to map the first logical address to the fourth physical address, and writes the data to the fourth physical address.

* * * * *